V. R. KOONTZ.
CLAMPING COLLAR FOR SPINDLES.
APPLICATION FILED AUG. 19, 1915.
1,183,211.
Patented May 16, 1916.
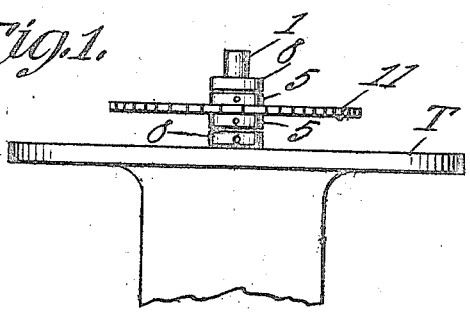
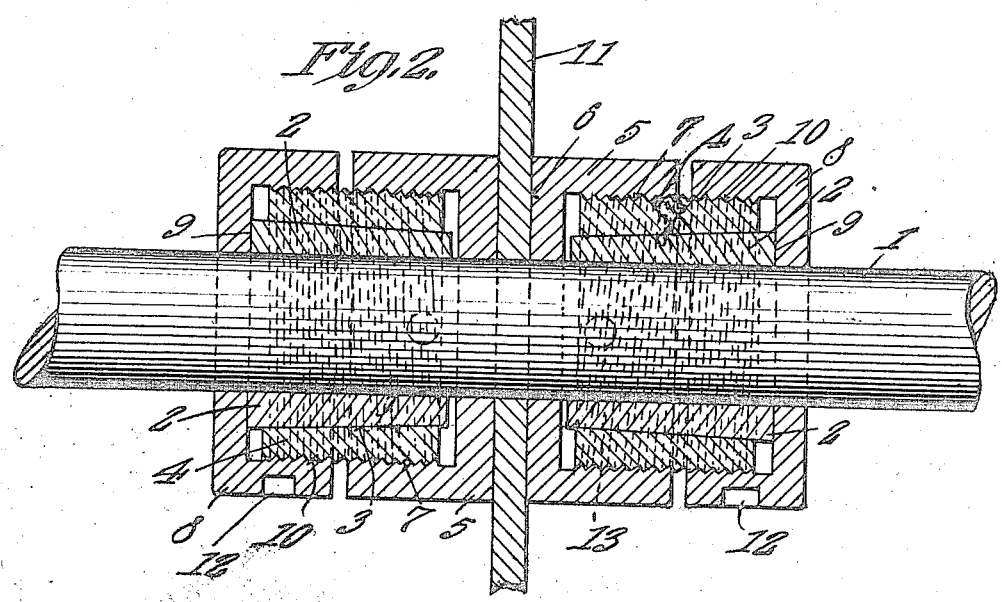
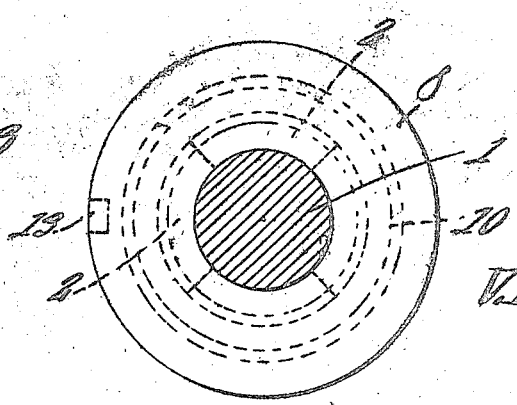
V. R. Koontz,
Inventor
By David P. Moore
Attorney

UNITED STATES PATENT OFFICE.

VICTOR R. KOONTZ, OF WAYNESBORO, PENNSYLVANIA.

CLAMPING-COLLAR FOR SPINDLES.

1,183,211.    Specification of Letters Patent.    Patented May 16, 1916.

Application filed August 19, 1915. Serial No. 46,376.

*To all whom it may concern:*

Be it known that I, VICTOR R. KOONTZ, a citizen of the United States, residing at Waynesboro, in the county of Franklin and State of Pennsylvania, have invented certain new and useful Improvements in Clamping-Collars for Spindles, of which the following is a specification, reference being had therein to the accompanying drawing.

The present invention relates to clamping collars for spindles, one object of the invention being the provision of two coöperating clamping members certain portions of which due to the resistance at the cutting edge of the cutting tool as the tool is primarily rotated will be simultaneously rotated an equal distance and thus cause a greater gripping upon the tool.

A further object of the present invention is the provision of two clamping members, one of which is provided with left-hand screw threads while the other is provided with right-hand screw threads so that the tool gripping members thereof will automatically be tightened at the initial resistance of the tool when its cutting edge is engaging the work.

A still further object of the present invention is the provision of a clamping collar which will at all times maintain a fixed center in the longitudinal direction of the spindle and which can also be used upon a cylindrical spindle without the use of the usual fixed collar.

With the foregoing and other objects in view and which will appear as the description proceeds, the invention resides in the details of construction hereinafter set forth and particularly claimed, there being possible changes in such details that will still be within the spirit of the invention.

In the accompanying drawings:—Figure 1 is a side elevation of a wood shaping machine table or bed and its spindle equipped with my clamping collar. Fig. 2 is a longitudinal section through the two members of the clamping collar and tool, the spindle being in elevation. Fig. 3 is an end view of the collar, the spindle being in cross section.

Referring to the drawings, the numeral 1 designates a collarless cylindrical spindle of a wood shaping machine, and T the bed or table of such machine.

The clamping collar consists of two members, each of which embodies a sectional clamping bushing 2, whose tapered exterior fits within the tapered bore 3 of the bushing 4. Each bushing 4 is exteriorly threaded, one being provided with left hand screw threads, while the other is provided with right hand screw threads. It will also be noted that the sectional bushing 2 is slightly longer than the bushing 4, so that a wedging action to lock the bushing upon the spindle may be had the full length of the bushing 4.

The tool engaging and clamping cap or member 5, is provided with the tool engaging face 6, to abut the tool 11, the rim or flange 7 thereof being provided with interior screw threads to engage the threaded portion of its respective bushing 4. Therefore one is provided with left hand and the other right hand threads.

A locking cap 8, which is similar in shape to the cap 5 fits upon the opposite end of its bushing 4, its flange 10 being threaded to correspond to the bushing, so that its flange 9 may be caused to engage the sectional bushing 2 and cause the bushing 4 to move and form with the sectional bushing a wedging lock to secure the bushing 4 to the spindle.

In use the tool 11 is placed upon the spindle toward one of the collars, the other collar being placed upon the spindle after the tool. The two bushings 4 are then locked fast upon the spindle, with the tool engaging caps 5 slightly spaced from the tool, the spanner receiving sockets 12 being provided in the caps 8 for this purpose. The spanner receiving sockets 13 of the caps 5 are now brought into play and both caps 5 are moved an equal distance to clamp the tool upon opposite sides.

It will thus be seen that when the spindle and cutting tool are rotated and the cutter is placed in engagement with the work, that the resistance due to such engagement, will cause both clamping caps 5 to move toward each other and thus more firmly grip the tool.

What I claim as new is:—

1. The combination with a spindle, of a clamping device mounted thereon and including two members, each member of which includes a sectional wedging element surrounding the spindle, a bushing surrounding the same and disposed to permit one end of the wedging element to protrude, a tool engaging member adjustably mounted upon one end of the bushing, and means for operating the wedging element mounted upon the opposite end of the bushing.

2. The combination with a cylindrical spindle of a clamping device, composed of two members, each member of which includes a sectional wedging bushing surrounding the spindle, a bushing having exterior threads and having a tapered bore to surround the sectional bushing, the threads of one bushing being left-hand while those of the other are right-hand, a tool engaging member fitting upon the threads at one end of the bushing, and a wedge actuating member fitted upon the opposite end of the bushing.

3. The combination with a cylindrical spindle and a cutting tool, of a clamping device therefor, comprising two members, each of said members including a sectional clamping bushing engaging the spindle, an exteriorly threaded bushing surrounding the clamping bushing, a clamping cap fitting upon one end of the bushing for operating the sectional bushing to lock the member upon the spindle, the threaded portions of one member being oppositely threaded from those of the other member, and a tool engaging cap carried upon the inner end of each of said bushings and coöperable with the threaded portions thereof to clamp the cutting tool therebetween.

In testimony whereof I affix my signature.

VICTOR R. KOONTZ.